United States Patent
Neuville et al.

(10) Patent No.: US 11,401,215 B2
(45) Date of Patent: Aug. 2, 2022

(54) METHOD FOR SELECTING THE COMPOSITION OF A CONSTRUCTION MATERIAL COMPRISING AN EXCAVATED CLAY SOIL, METHOD AND SYSTEM FOR PREPARING SUCH A CONSTRUCTION MATERIAL

(71) Applicant: MATERR'UP, Saint-Geours-de-Maremne (FR)

(72) Inventors: Mathieu Neuville, Soustons (FR); Manuel Mercé, Benesse Maremne (FR)

(73) Assignee: MATERR'UP, Saint-Geours-de-Maremne (FR)

( * ) Notice: Subject to any disclaimer, the term of this patent is extended or adjusted under 35 U.S.C. 154(b) by 0 days.

(21) Appl. No.: 17/436,674

(22) PCT Filed: Mar. 6, 2020

(86) PCT No.: PCT/FR2020/050469
§ 371 (c)(1),
(2) Date: Sep. 7, 2021

(87) PCT Pub. No.: WO2020/178538
PCT Pub. Date: Sep. 10, 2020

(65) Prior Publication Data
US 2022/0041516 A1 Feb. 10, 2022

(30) Foreign Application Priority Data
Mar. 6, 2019 (FR) ...................................... 1902304

(51) Int. Cl.
| C04B 40/00 | (2006.01) |
| C04B 14/06 | (2006.01) |
| C04B 18/14 | (2006.01) |
| C04B 24/12 | (2006.01) |
| C04B 28/00 | (2006.01) |
| C04B 103/00 | (2006.01) |
| C04B 103/10 | (2006.01) |

(52) U.S. Cl.
CPC .......... *C04B 40/0032* (2013.01); *C04B 14/06* (2013.01); *C04B 18/141* (2013.01); *C04B 24/128* (2013.01); *C04B 28/001* (2013.01); *C04B 2103/0081* (2013.01); *C04B 2103/10* (2013.01)

(58) Field of Classification Search
CPC ..... C04B 14/06; C04B 18/141; C04B 24/128; C04B 28/001; C04B 40/0032; C04B 2103/10; C04B 2103/0081; C04B 12/04; C04B 14/303; C04B 22/06; C04B 22/16; C04B 22/062; C04B 24/003; C04B 24/023; C04B 24/18; C04B 24/122; C04B 24/24; C04B 24/2641; C04B 2103/0094; C04B 2103/402; C04B 2103/406; C04B 2103/408; Y02W 30/91
See application file for complete search history.

(56) References Cited

U.S. PATENT DOCUMENTS

| 6,042,258 A | 3/2000 | Hines et al. |
| 10,544,060 B2 | 1/2020 | Hoffmann |
| 2006/0185559 A1 | 8/2006 | Chang |

FOREIGN PATENT DOCUMENTS

| CN | 101234880 A | * | 8/2008 | ............ C04B 28/14 |
| CN | 106278142 A | * | 1/2017 | |
| DE | 342403 C | | 9/1919 | |
| DE | 354069 C | | 5/1922 | |
| DE | 10037609 C1 | | 9/2002 | |
| EP | 2296854 A2 | | 3/2011 | |
| FR | 1482794 A | | 5/1967 | |
| FR | 2751911 A1 | | 2/1998 | |
| FR | 3016376 A1 | | 7/2015 | |
| FR | 3034094 A1 | | 9/2016 | |
| JP | H08277174 A | | 10/1996 | |
| WO | 2003089383 A1 | | 10/2003 | |

OTHER PUBLICATIONS

International Search Report & Written Opinion in PCT/FR2020/050469 dated Aug. 7, 2020, 31 pages (including translation).

* cited by examiner

*Primary Examiner* — Anthony J Green
(74) *Attorney, Agent, or Firm* — Pearne & Gordon LLP

(57) ABSTRACT

The invention relates to a method (100) for selecting the composition of a construction material including an excavated clay soil, said construction material composition to include deflocculating agent and activating agent quantities adapted to the excavated clay soil, said method including a step of receiving (130) a measured value of at least one physicochemical property of an excavated clay soil, and a step of selecting (170) a deflocculating agent quantity and an activating agent quantity adapted to the excavated clay soil. In addition, the invention also relates to a method (200) for calibrating a calculation algorithm for determining the composition of a site construction material, to a construction material formed from an excavated clay soil, and to a system (400) for preparing a construction material including an excavated clay soil.

26 Claims, 5 Drawing Sheets

METHOD FOR SELECTING THE COMPOSITION OF A CONSTRUCTION MATERIAL COMPRISING AN EXCAVATED CLAY SOIL, METHOD AND SYSTEM FOR PREPARING SUCH A CONSTRUCTION MATERIAL

The invention relates to the field of construction materials, and more particularly that of materials which can be used in construction such as construction binders or concretes. The invention relates to a method for selecting the composition of a construction material including an excavated clay soil. The invention also relates to a method for calibrating a calculation algorithm for determining the composition of a site construction material including excavated clay soil, to a construction material formed from an excavated clay soil, and to a system for preparing a construction material including an excavated clay soil.

PRIOR ART

Cement is the second most consumed resource in the world, with more than 4 billion tons of material produced each year worldwide, and this consumption is constantly increasing, driven by the growing demand for housing and infrastructure.

Cement is a binder, usually hydraulic, which when mixed with water hardens and sets. After curing, the cement retains its strength and stability even when exposed to water. There is a wide variety of cements used around the world. In addition, cement preparation methods are becoming increasingly sophisticated and automated systems for the preparation of various types of concrete have been developed (FR2751911, EP2296854).

Nevertheless, all conventional cements contain clinker at a percentage varying from 5% for some blast furnace cements to a minimum of 95% for Portland cement, which is the most widely used cement in the world today. Clinker is the result of firing a mixture comprised of about 80% limestone and 20% aluminosilicates (such as clays). This firing, clinkerization, is done at a temperature of more than 1200° C., therefore such a cement preparation method implies a high energy consumption. In addition, the chemical conversion of limestone to lime also releases carbon dioxide. As a result, the cement industry generates about 8% of global $CO_2$ emissions. In response to this challenge, industry and researchers are exploring ways to reduce the impact of carbon dioxide emissions from the cement industry.

In addition to these carbon emissions, the management of excavated soil is also an issue in the context of large urban development projects. This excavated soil is generally stored or used to fill in quarries, or for park development, but the potential use is much lower than the volumes available. In addition, it has been proposed to use this excavated earth for the production of construction materials, but this application comes up against the problems of insufficient mechanical strength of raw soil constructions, on the one hand, and the non-optimal carbon footprint when using metakaolin.

Indeed, the proposed cements based on raw earth, as described in document FR3016376, either have physical properties, such as improved mechanical strength, reduced capillary absorption, or reduced permeability to liquids, which are too weak; or they require the addition of a portion of Portland cement in order to have acceptable mechanical properties.

For metakaolin-based cements, the mixture of lime or sodium hydroxide and metakaolin during the hydration of the cement will induce a pozzolanic reaction. This reaction improves the binding properties of metakaolin cements. Because of these properties, metakaolin-based construction materials have been proposed, including in particular a flashed metakaolin associated with sodium hydroxide, as described in document FR3034094. Nevertheless, the formation of metakaolin requires a thermal treatment of kaolinitic clays to lead to the dehydroxylation of the kaolinite crystalline structure, which induces an unfavorable carbon balance, especially when taking into account the transport of excavated soil to the thermal units.

Thus, there is a need for new uses of excavated clay soil that can advantageously allow for a reduction of greenhouse gas emissions and the preparation of a construction material such as a construction binder or a site concrete with a low carbon footprint while having mechanical properties at least equivalent or even superior to the mechanical properties of cements commonly used in the construction industry.

Technical Problem

The invention therefore aims to overcome the disadvantages of the prior art. In particular, the invention aims to provide a method for selecting the composition of a construction material including an excavated clay soil, said method making it possible to form a construction material, such as a construction binder, for reducing, on the one hand, the emission of greenhouse gases, such as carbon dioxide, while at the same time conferring mechanical characteristics suitable for its use in the construction industry, and, on the other hand, to propose a site concrete including such a binder and capable of improving the comfort of the inhabitants in comparison with a concrete formed from Portland cement.

The invention also aims to propose a construction material formed from an excavated clay soil with mechanical properties suitable for its use in the construction industry, while constituting a way of reclaiming excavated clay soil.

The invention also aims to propose a method and a system for preparing a construction material including an excavated clay soil for reducing the emission of greenhouse gases compared to a conventional construction material of the Portland cement type.

BRIEF DESCRIPTION OF THE INVENTION

To this end, the invention relates to a method for selecting the composition of a construction material including an excavated clay soil, said construction material composition to include deflocculating agent and activating agent quantities adapted to the excavated clay soil, said method being implemented by a computer device including a calculation module, said method including:

A step of receiving, from the calculation module, a measured value of at least one physicochemical property of an excavated clay soil; and A step of selecting, by the calculation module, a deflocculating agent quantity and an activating agent quantity adapted to the excavated clay soil based on a comparison of the one or more measured values with reference values, said reference values including correlations between measured values of at least one physicochemical property of a clay soil and deflocculating agent and activating agent quantities adapted to said clay soil to form a construction material.

Such a selection method has the advantage of being able to select at least part of the constituents of a construction material based on an excavated clay soil so as to form a construction material, such as a construction binder or a site concrete, with mechanical properties equivalent to the mechanical properties of conventional construction materials using clinkers. Indeed, with the methods of the prior art, the construction materials obtained from excavated soil are generally not sufficiently efficient from a mechanical point of view to allow for a wide use.

Furthermore, the constituents selected by the selection method (i.e. excavated clay soil, deflocculating agent, and activating agent) allow the formation of a construction material in a less energy consuming preparation method.

Finally, since the construction material includes an excavated clay soil, preferably not having undergone a combustion stage, it advantageous retains hygrothermal properties allowing the comfort of the inhabitants to be improved compared with a concrete formed from Portland cement.

According to other optional features of the selection method:
 the at least one physicochemical property is selected from: the content of clays in the excavated clay soil, the nature of the clays, the particle size, the content of impurities, the content of non-clay mineralogical fractions, the content of contaminants, the elemental analysis, the content of metal oxides, the salinity, the pH, and the total exchange capacity of the clay in the excavated clay soil. Preferably, the at least one physicochemical property is selected from: the content of clays in the excavated clay soil, the nature of the clays, the particle size, the content of non-clay mineralogical fractions, the elemental analysis, the content of metal oxides, the salinity, the pH, and the total exchange capacity of the clay in the excavated clay soil. More preferably, the at least one physicochemical property is selected from: the content of clays in the excavated clay soil, the nature of the clays, the particle size, the content of non-clay mineralogical fractions, the content of metal oxides, and the total exchange capacity of the clay in the excavated clay soil. Such physicochemical properties are the most likely to provide deflocculating agent and activating agent values adapted to the excavated clay soil considered.
 the at least one physicochemical property is measured on a pretreated excavated clay soil, said pretreatment being selected from: crushing, sorting, sieving, and/or drying of the excavated clay soil. This advantageously allows the error in the measurements made to be minimized. Preferably, the pretreatment includes at least one fractionation, for example by sieving or sedimentation, more preferably fractionation at 50 μm and for example fractionation at 20 μm.
 It previously comprises receiving a desired mechanical property value of the construction material and the step of selecting the deflocculating agent and activating agent quantities further includes excluding the deflocculating agent and activating agent quantities which will not allow the construction material to exhibit the desired mechanical property value. Thus, an operator can easily set an objective performance criterion for the construction material, the composition of which is expected. This saves time and performance is increased in the process of reclaiming excavated soil for a construction application.
 the step of selecting, by the calculation module, a deflocculating agent quantity and an activating agent quantity adapted to the excavated clay soil includes implementing a previously calibrated calculation algorithm.
 the previously calibrated calculation algorithm has been obtained by implementing a statistical supervised learning method.

According to another aspect, the invention further relates to a method for calibrating a calculation algorithm for determining the composition of a construction material, such as a construction binder or a site concrete, for example implemented by a digital device including a learning module, characterized in that it includes:
 A first step of receiving, from the learning module, a measured value of at least one physicochemical property of an excavated clay soil;
 A second step of receiving, from the learning module, a deflocculating agent quantity value and an activating agent quantity value which, when added to the excavated clay soil, allow a construction material to be formed;
 A third step of receiving, from the learning module, a measured value of at least one mechanical property of the construction material formed from the excavated clay soil, the value of at least one physicochemical property of which was received in the first receiving step, and from the deflocculating agent and activating agent quantities received in the second reception step; and
 A step of creating a correlation, by the learning module, between the received measured values in order to calibrate a calculation algorithm.

The combination of an excavated clay soil, a deflocculating agent, and an activating agent allows a construction material with appreciable mechanical properties to be produced and the selection method according to the invention allows appropriate quantity values to be selected. However, considering the complexity and variability of the physicochemical properties of the excavated clay soils, the inventors have developed a method of calibrating a calculation algorithm allowing this complexity to be overcome. Such a calibration method allows deflocculating agent and activating agent quantity values to be proposed that are highly adapted to the excavated clay soil. It should be noted that the reception order is not important and allows the description of the method to be clarified.

According to another aspect, the invention further relates to a method for preparing a construction material from an excavated clay soil, the method including:
 A step of measuring at least one physicochemical property of the excavated clay soil;
 A selection step according to a method for selecting the composition of a construction material including a clay soil excavated according to the invention; and
 A step of mixing the excavated clay soil, a deflocculating agent, and an activating agent according to the selected composition.

Such a simple and fast method allows the emission of greenhouse gases to be reduced during its implementation compared to the implementation of a method for preparing a conventional construction material of the Portland cement type.

According to other optional features of the preparation method, it further includes:
 a step of measuring physicochemical or mechanical properties of the construction material being formed, during the mixing step, a step of comparing the measured values with predetermined values of physicochemical or mechanical properties of the construction material being formed, and when the measured values differ from the predetermined values of the physicochemical or mechanical properties of the construction material being formed, a step of adding at least one complementary ingredient.

Thus, the verification of the properties of the construction material being formed allows a quality control to be carried out on line, that is to say preferably in real time, so as to ensure that the construction material formed will have mechanical properties as close as possible to the expected mechanical properties. Indeed, a deviation can be identified at the time of mixing and corrected before the construction material is finalized and a fortiori used.

According to another aspect, the invention relates to a computer program product configured to run a selection method according to the invention.

According to another aspect, the invention relates to a computer program product configured to run a calibration method according to the invention.

According to another aspect, the invention further relates to a construction material formed from an excavated clay soil characterized in that it includes a deflocculating agent and an excavated clay soil. Preferably, the invention further relates to a construction material formed from an excavated clay soil characterized in that it includes an excavated clay soil, an activating agent and a deflocculating agent, said deflocculating agent accounting for at least 0.1 wt % of the construction material, preferably at least 0.25 wt % of the construction material.

The activating agent is not systematically found in the construction binder or in the site concrete since it can react with constituents of the excavated clay soil and be transformed. Nevertheless, in some cases, a construction material according to the invention, formed from an excavated clay soil, may further include an activating agent.

Such a construction material formed from an excavated clay soil has mechanical properties suitable for its use in the construction industry while constituting a way to reclaim the excavated clay soil.

According to other optional features of the construction material according to the invention, it includes a mixture of different types of clays.

In addition, it may include at least 2 wt % of silt particles, preferably at least 4 wt %, more preferably at least 6 wt %. The silt particles are in particular particles with a diameter between 2 µm and 50 µm.

A construction material according to the invention may include metal oxides at a content of at least 2 wt % of the construction material.

A construction material according to the invention may further include blast furnace slag.

A construction material according to the invention may include from 30% to 80 wt % of an excavated clay soil, from 0.1% to 10 wt % of a deflocculating agent, and from 5 to 10 wt % of blast furnace slag. In this case, the construction material preferably corresponds to a construction binder.

A construction material according to the invention may include:
between 5 and 20 wt % of a raw clay from the excavated clay soil;
between 0.1 and 3 wt % of a deflocculating agent;
between 3 and 15 wt % of an activating agent;
between 25 and 45 wt % of sand; and
between 35 and 55 wt % of aggregates;

said construction material then preferably corresponding to a site concrete.

As shown in the examples, the construction materials according to the invention have improved mechanical performance.

In addition, the excavated clay soil may advantageously have been pretreated, said pretreatment being selected from: crushing, sorting, sieving and/or drying of the excavated clay soil. The pretreatment may for example include fractionation.

According to another aspect, the invention relates to a method for preparing a construction material according to the invention from an excavated clay soil including:
a step of excavating a clay soil;
optionally a step of screening the excavated clay soil when the excavated clay soil includes stones retained by a 2 cm screening; and
a step of mixing the excavated clay soil, preferably the fraction of less than 50 µm, a deflocculating agent and an activating agent.

According to another aspect, the invention further relates to a system for preparing a construction material including an excavated clay soil, said system including:
At least one container including an excavated clay soil;
At least one container including a deflocculating agent;
At least one container including an activating agent;
A mixing device, with automated transport means between the containers and the mixing device;
A control module configured to generate output signals for use by the automated transport means to transport determined deflocculating agent and activating agent quantities to the mixing device.

Advantageously, the system for preparing a construction material according to the invention includes a communication means configured to receive data on a determined deflocculating agent quantity and a determined activating agent quantity, adapted to the excavated clay soil; the control module being configured to generate output signals for use by the automated transport means so as to transport the determined deflocculating agent and activating agent quantities to the mixing device.

Preferably, the system for preparing a construction material according to the invention includes: A means for measuring at least one physicochemical property of the excavated clay soil, A calculation means able to implement a computer program configured to perform: A step of obtaining a measured value of at least one physicochemical property of the excavated clay soil; and A step of determining a deflocculating agent quantity and an activating agent quantity adapted to the excavated clay soil based on a comparison of the one or more measured values with reference values.

In particular, the invention further relates to a system for preparing a construction material including an excavated clay soil, said system including:
At least one container including an excavated clay soil;
At least one container including a deflocculating agent;
At least one container including an activating agent;
A mixing device, with automated transport means between the containers and the mixing device;
A means for measuring at least one physicochemical property of the excavated clay soil;
A calculation means adapted to implement a computer program configured to perform:
A step of obtaining a measured value of at least one physicochemical property of the excavated clay soil, and A step of determining a deflocculating agent quantity and an activating agent quantity suitable for the excavated clay soil based on a comparison of the one or more measured values with reference values; and A control module configured to generate output signals for use by the automated transport means so as to transport the determined deflocculating agent and activating agent quantities to the mixing device.

Such a system allows the automated formation of a construction binder or possibly a site concrete (with the addition of fillers) from excavated clay soil, with these construction materials having mechanical properties equivalent to the mechanical properties of conventional materials with a much larger carbon footprint.

BRIEF DESCRIPTION OF THE DRAWINGS

Other advantages and features of the invention will appear upon reading the following description given by way of illustrative and non-limiting example, with reference to the appended figures.

Figure 1:
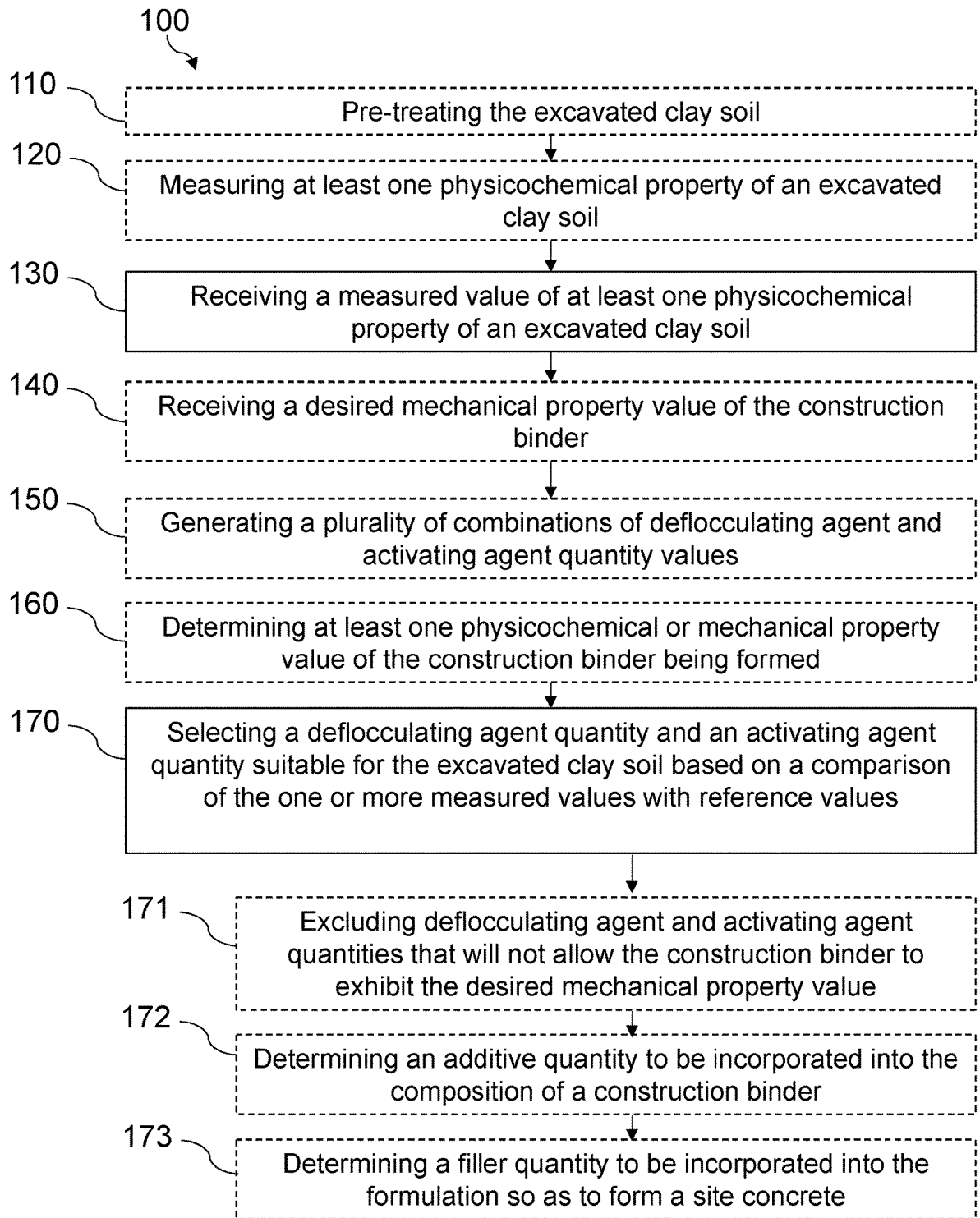
FIG. 1 represents the steps of a method for selecting the composition of a construction material including an excavated clay soil according to one embodiment of the present invention. The steps in dotted lines are optional.

Aspects of the present invention shall be described with reference to flowcharts and/or block diagrams of methods, apparatus (systems) and computer program products according to embodiments of the invention. In the figures, the flowcharts and block diagrams illustrate the architecture, the functionality and the operation of possible implementations of systems, methods and computer program products according to various embodiments of the present invention.

In this respect, each block in the flowcharts or block diagrams may represent a system, device, module, or code, which comprises one or more executable instructions for implementing the one or more specified logical functions. In some implementations, the functions associated with the blocks may appear in a different order than shown in the figures. For example, two blocks shown in succession may, in fact, be executed substantially simultaneously, or the blocks may sometimes be executed in reverse order, depending on the functionality involved. Each block in the flow diagrams and/or flowchart, and combinations of blocks in the flow diagrams and/or flowchart, may be implemented by special hardware systems that perform the specified functions or acts or perform combinations of special hardware and computer instructions.

DESCRIPTION OF THE INVENTION

In the remainder of the description, the expression "clay soil" must be understood as corresponding to a soil originating from a clay-containing soil, or more generally from a loose formation with a fine particle size, and therefore containing one or more rocky materials based on hydrated silicates or aluminosilicates of a lamellar structure. In particular, a clay soil can correspond to soil such as sandy-clayey silt soil, clayey-silty soil, clayey-sandy soil, clay soil. Preferably, a clay soil includes at least 25 wt % of clay, preferably at least 30 wt % of clay, more preferably at least 40 wt % of clay. The clay content by weight can be determined by standard methods of the prior art such as the particle size method described in the NF X31-107 standard. Furthermore, preferably, a clay soil in the framework of the invention includes at most 95 wt % clay, preferably at most 90 wt % clay, more preferably at least 80 wt % clay.

The expression "excavated clay soil" corresponds, within the meaning of the invention, to a clay soil obtained following a step where the soil has been dug up, for example during leveling and/or earthwork operations, with the aim of constructing, building, or backfilling. In particular, within the meaning of the invention, the excavated clay soil may or may not be moved from the production site. Preferably and according to an advantage of the invention, the excavated soil is used on the production site or at a distance of less than 200 km. In addition, advantageously, the clay soil excavated within the framework of the invention is a raw excavated clay soil, that is to say it has not undergone a calcination step. In particular, that is, it has not been subjected to any heat pretreatment. For example, this corresponds to a clay soil which has not undergone a rise in temperature higher than 300° C., preferably higher than 200° C., and more preferably a temperature higher than 150° C. Indeed, the raw clay can undergo a heating step requiring a temperature rise generally substantially equal to 150° C., but no calcination step. Conventionally used clay has a relatively constant particle size profile with sizes below 2 μm. Excavated clay soil can have different particle size profiles. In the framework of the invention, an excavated clay soil may include particles of a size greater than 2 μm, preferably greater than 20 μm, more preferably greater than 50 μm, and for example greater than 75 μm as determined according to the ASTM D422-63 standard. Preferably, the excavated clay soil does not include any aggregate larger than 2 cm as determined according to the NF EN 933-1 standard.

The term "wt %" in relation to excavated clay soil, composition, binder, or site concrete shall be understood as a proportion to the dry weight of the composition, binder, or site concrete. The dry weight corresponds to the weight before the addition of water, which is for example necessary to form a construction material.

The expression "construction material", within the meaning of the invention, corresponds to a construction binder or a site concrete. The site concrete will in particular include fillers such as aggregates and/or sand.

By "deflocculating agent" is meant any compound which, in aqueous suspension, will dissociate aggregates and colloids. Deflocculating agents have been used, for example, in the context of oil drilling or extraction to make the clay more fluid and facilitate extraction or drilling.

By "activating agent" is meant any composition having the function of accelerating the dispersion of an aluminosilicate source promoting the formation of stable hydrates with low solubility and the formation of a compact structure with these hydrates, thereby increasing the mechanical strength of materials incorporating such an activating composition.

The term "particle size", within the meaning of the invention, corresponds to the distribution of the elements and particles of the clay soil according to the relative proportion by weight of the different classes of particles, identified by their size and constituting the mineral skeleton of the soil. Five particle size classes exist: —Clays (0 to 2 micrometers)—Fine silts (2 to 20 micrometers)—Coarse silts (20 to 50 micrometers)—Fine sands (50 to 200 micrometers)—Coarse sands (200 to 2000 micrometers).

The expression "nature of the clays" corresponds, within the meaning of the invention, to the chemical and/or mineralogical properties of the clays. This corresponds in particular to the chemical composition of the clays, but also to their mineralogy and their physical characteristics (such as specific surface, porosity, morphology). For example, this may correspond to the identification of the clay by its common name (e.g. kaolinite, illite, montmorillonite, smectite, bentonite, chlorite and vermiculite).

The expression "metallic trace elements" corresponds, within the meaning of the invention, to metallic chemical elements and in particular they correspond, within the meaning of the invention, to metals selected from: iron, lead, mercury, uranium, chromium, copper, cadmium, silver, gold, zinc, nickel, or titanium.

the term "substantially equal", within the meaning of the invention, corresponds to a value varying by less than 20% with respect to the compared value, preferably by less than 10%, even more preferably by less than 5%.

By "model" or "rule" or "calculation algorithm", is to be understood, within the meaning of the invention, a finite sequence of operations or instructions making it possible to select deflocculating agent and activating agent quantity values, that is to say, for example, to form previously defined groups Y associated with scores or categories as a function of correlation with deflocculating agent D and activating agent A quantities, on the one hand, and one or more values of physicochemical properties of excavated clay soil E. The implementation of this finite sequence of operations makes it possible, for example, to assign a label $Y_0$ to an observation described by a set of characteristics $D_0$, $A_0$, $E_0$ thanks, for example, to the implementation of a function $f$ capable of reproducing Y having observed D, A and E.

$$Y=f(D,A,E)+e$$

where e symbolizes noise or measurement error.

Herein, Y can for example be the ability (yes/no) to form a construction material.

Advantageously, the calculation algorithm can establish previously defined groups, associate other values such as values of mechanical properties M of the construction material that can be formed from these quantities. Thus, with the formula "M=f(D,A,E)+e", it is possible to select quantity values for forming construction materials with predetermined mechanical properties.

By "supervised learning method" is meant, within the meaning of the invention, a method for defining a function $f$ from a base of n labeled observations ($X_{1 \ldots n}$, $Y_{1 \ldots n}$, $D_{1 \ldots n}$, $A_{1 \ldots n}$, $E_{1 \ldots n}$) where, for example, Y=f(D,A,E)+e or M=f(D,A,E)+e.

By "process", "calculate", "determine", "display", "extract", "compare", or more broadly an "executable operation" is meant, within the meaning of the invention, an action performed by a device or a processor unless the context indicates otherwise. In this respect, operations refer to actions and/or processes in a data processing system, such as a computer system or electronic computing device, which manipulates and transforms data represented as physical (electronic) quantities in the memories of the computer system or other devices for storing, transmitting, or displaying information. In particular, calculation operations are performed by the processor of the device, the data produced are written into a corresponding field in a data memory and this field or these fields can be returned to a user for example through an adapted Human Machine Interface, such as by way of non-limiting examples a screen of a connected object, formatting such data. These operations may be based on applications or software.

The terms or expressions "application", "software", "program code", and "executable code" mean any expression, code, or notation, of a set of instructions intended to cause a data processing to perform a particular function directly or indirectly (for example after a conversion operation into another code). Exemplary program codes may include, but are not limited to, a subprogram, a function, an executable application, a source code, an object code, a library and/or any other sequence of instructions designed for being performed on a computer system.

By "processor" is meant, within the meaning of the invention, at least one hardware circuit configured to perform operations according to instructions contained in a code. The hardware circuit may be an integrated circuit. Examples of a processor include, but are not limited to, a central processing unit, a graphics processor, an application-specific integrated circuit ("ASIC" according to an Anglo-Saxon terminology), and a programmable logic circuit. A single processor or several other units may be used to implement the invention.

By "coupled" is meant, within the meaning of the invention, connected, directly or indirectly, with one or more intermediate elements. Two elements may be coupled mechanically, electrically, or linked by a communication channel.

The expression "human-machine interface", within the meaning of the invention, corresponds to any element allowing a human being to communicate with a computer, in particular and without that list being exhaustive, a keyboard and means allowing in response to the commands entered on the keyboard to perform displays and optionally to select with the mouse or a touchpad items displayed on the screen. Another embodiment is a touch screen for selecting directly on the screen the elements touched by the finger or an object and optionally with the possibility of displaying a virtual keyboard.

In the claims, the term "comprise" or "include" does not exclude other elements or other steps.

In the following description, the same references are used to designate the same elements. The reference signs should not be understood as limiting the scope of the invention. In addition, the different features presented and/or claimed can be advantageously combined. Their presence in the description or in different dependent claims, do not exclude this possibility.

As mentioned above, the current situation is that there is plenty of excavated soil, which is often considered as waste and therefore constitutes, when developing a site, an additional burden for developers. Such management, and in particular the pollution that may be generated by the transport of these excavated soils, adds to the pollution generated by the preparation of conventional cement (e.g. Portland).

Faced with this observation, the inventors have identified a method for selecting a composition for a construction material using excavated clay soil and making it possible to obtain a construction binder with mechanical properties similar to those of conventional cement (e.g. Portland). Using this method, they are able, as will be shown in the examples, to generate a construction binder which could be advantageously, but not limitatively, used as a replacement for Portland cement, lime, or CSA. Thus, the waste (i.e. excavated clay) combined in particular proportions with a deflocculating agent and an activating agent, can become a raw material in a construction method.

Moreover, given its preparation method, on the one hand, and the use of excavated clay soil, the construction material according to the invention has the advantage of having a carbon footprint at least two times lower than most of the construction materials, or hydraulic binder, most used in the world today (i.e. Portland cement). Indeed, a construction material according to the invention is mainly made of a clay soil and has a zero or lower clinker content than equivalent products and allows, with equivalent mechanical properties, to reduce $CO_2$ emissions and production costs.

Moreover, the clay soil has preferably not undergone a calcination step, an energy-consuming step which also generates the emission of greenhouse gases and more particularly of carbon dioxide.

Finally, advantageously, as will be presented in the examples, a construction binder according to the invention allows construction materials having mechanical properties at least equivalent to Portland cement and much superior to "low carbon" materials, such as those described above, to be produced.

Thus, according to a first aspect, the invention relates to a method 100 for selecting the composition of a construction material including an excavated clay soil. Since the construction binder may subsequently be used to form a site concrete, for example, following the addition of a filler, the selection method 100 may alternatively correspond to a method 100 for selecting the composition of a site concrete.

In particular, for the preparation of a construction material from the excavated clay soil to be possible, the construction material composition must include deflocculating agent and activating agent quantities adapted to the excavated clay soil.

To this end, a method according to the invention, preferably implemented by a computer device including a calculation module, may include a step of receiving 130, from the calculation module, a measured value of at least one physicochemical property of an excavated clay soil; and a step of selecting 170, by the calculation module, a deflocculating agent quantity and an activating agent quantity adapted to the excavated clay soil.

In addition, a method according to the invention may include steps such as: previously treating 110 the excavated clay soil, measuring 120 physicochemical properties of the excavated clay soil, receiving 140 desired mechanical property value of the construction material, generating 150 a plurality of combinations of deflocculating agent and activating agent quantity values, determining 160 a desired mechanical property value of the construction material, or determining at least one physicochemical or mechanical property value of the construction material being formed.

As illustrated in FIG. 1, the selection method according to the invention may include a step of previously treating 110 the excavated clay soil. Thus, advantageously, the one or more measurement values are obtained from a sample of excavated clay soil having undergone a pretreatment step 110 of the excavated clay soil.

This pretreatment step may for example include or consist of fractioning, crushing, sorting (e.g. according to the color), sieving, and/or drying of the excavated clay soil.

In particular, since, in the framework of the present invention, the clay soil is an excavated soil, it may include coarse elements or fractions of high dimensions which would be advantageously removed in the first stages of the method. Thus, in particular, the method according to the invention may include removing elements having at least one dimension greater than 1 cm (for centimeter), preferably removing elements having at least one dimension greater than 0.2 cm. Preferably, the method according to the invention may include removing elements having at least a size greater than 1 cm, preferably greater than 475 µm (for micrometer), more preferably greater than 75 µm as determined according to the ASTM D422-63 standard.

In addition, the method according to the invention may include a step of measuring 120 at least one physicochemical property of an excavated clay soil. This step is preferably carried out on a sample of excavated clay soil and can be performed on site or in a specialized laboratory. Indeed, depending on the one or more physicochemical properties measured, it will be possible or not to have transportable instruments.

The measuring step 120 may include, for example, a step of measuring:

the clay content in the excavated clay soil, measured for example by a particle size method such as that described in the NF X31-107 standard;

the nature of the clays, obtained for example by X-ray diffractometry;

the content of impurities and in particular of metallic trace elements, obtained for example by elemental analysis using an ICP-MS apparatus;

the salinity with a conductivity meter measuring the conductivity of a clay soil wash water;

the pH using a pH meter measuring the pH of a clay soil wash water; and the total exchange capacity of the clay in the excavated clay soil measured for example by the so-called methylene blue method according to the NF EN 933-9+A1 standard.

Thus, the measuring step 120 may, for example, include using a pH meter, an X-ray diffractometer, a conductivity meter, an electron microscope, a mercury porosimeter, a spectrofluorometer, an ICP-MS (in English: Inductively Coupled Plasma Mass Spectrometry), HPLC-MS (liquid chromatography coupled to mass spectrometry), GC-MS (gas chromatography coupled to mass spectrometry), measuring the specific surface by the BET method (Specific surface measurement, for Brunauer-Emmett-Teller), a granulometer, or a TGA (for thermogravimetric analysis) rheometer.

The method according to the invention includes a step of receiving 130 a measured value of at least one physicochemical property of an excavated clay soil. In particular, this step can be implemented by the calculation module of the digital device.

The physicochemical property of the excavated soil, the measured value of which is received, can be selected from: the content of clays in the excavated clay soil, the nature of the clays, the particle size, the impurity content, the presence of pollutants, the liquidity limit, the plasticity limit, the content of metal oxides, the salinity, the pH, and the total exchange capacity of the clay in the excavated clay soil. For example, the physicochemical property of the excavated soil, the measured value of which is received, may be selected from: the content of clays in the excavated clay soil, the nature of the clays, the particle size, the content of impurities, the content of metal oxides, the salinity, the pH, and the total exchange capacity of the clay in the excavated clay soil. Preferably, the physicochemical property of the excavated soil, the measured value of which is received, can for example be selected from: the content of clays in the excavated clay soil, the liquidity limit, and the plasticity limit. More preferably, the physicochemical property of the excavated soil, the measured value of which is received, includes the content of clays in the excavated clay soil.

In particular, the content of impurities may correspond to the content of metals and advantageously of metal oxides such as: iron oxide or aluminum oxide.

Preferably, measured values of at least two physicochemical properties of an excavated clay soil are received, more preferably at least three, and even more preferably at least four. Indeed, depending on the number of physicochemical properties taken into account, the result of the selection method can be of better quality.

The one or more physicochemical properties are physicochemical properties of widely studied soils such as pH, particle size, content of clays.

In particular, the method according to the invention includes receiving 130 a combination of measured values selected from:
- the content of clays in the excavated clay soil and the nature of the clays;
- the content of clays and the total exchange capacity of the clay in the excavated clay soil;
- The content of clays and the quantity of pollutants;
- the pH and the content of clays of the excavated clay soil; or
- the total exchange capacity of the clay in the excavated clay soil and the particle size.

Further, as shown in FIG. 1, the method according to the invention may include receiving 140 a desired mechanical property value of a construction material.

Indeed, in addition to selecting the composition of a construction material, the method according to the invention can advantageously make it possible to select a composition of a construction material allowing the preparation of a construction material which will have given mechanical properties. Thus, a user will be able to select the most appropriate quantities to obtain a construction material that meets his/her needs.

The desired mechanical properties of the construction material can for example be selected from: compressive strength, drying shrinkage, setting time, flexural strength, tensile strength, Young's modulus, Poisson's ratio.

For example, the method according to the invention may include receiving a desired compressive strength value for the construction material. This value can for example consist of a lower bound (e.g. 20 MPa, for MegaPascal, or 30 MPa) or a fixed value (e.g. 40 MPa).

Preferably, when the method according to the invention includes receiving 140 a desired mechanical property value of the construction material, the step of selecting 170 the deflocculating agent and activating agent quantities further includes excluding 171 the deflocculating agent and activating agent quantities which will not allow the construction material to exhibit the desired mechanical property value. For example, this may correspond to a selection via the calculation algorithm of all values of A and D which allow, from a measured value of E, to yield a value of M=40 MPa. Alternatively, in the absence of a calculation algorithm, this may include filtering out all values from a database for which the value of M is less than 30 MPa.

The step of receiving 130 a measured value of at least one physicochemical property of an excavated clay soil may be followed by a step of generating 150 a plurality of combinations of deflocculating agent quantity values, on the one hand, and activating agent quantity values, on the other hand. Following the generation of this plurality of values, the calculation module may implement a value selection step 170 as described below.

In addition, the method according to the invention may include a step of determining 160 at least one physicochemical property or mechanical property value expected for the construction material. This step is for example implemented by a calculation module.

From the measured values of physicochemical properties of the excavated clay soil and from the generated deflocculating agent and activating agent quantity values, it is then possible to determine a value of a mechanical property of a construction material formed from the excavated soil and the considered deflocculating agent and activating agent quantities.

The method according to the invention includes a step of selecting 170 a deflocculating agent quantity and an activating agent quantity adapted to the excavated clay soil. This step can for example be implemented by a calculation module.

The deflocculating agent and activating agent quantity may correspond to a volume, a mass or a proportion. Preferably, the quantity corresponds to a proportion relative to an excavated clay soil quantity to be added to the construction material composition. Alternatively, if the quantity corresponds to a volume or mass, it is then associated with a quantity of excavated clay soil to be added to the construction material composition.

In addition, selecting 170 a deflocculating agent quantity and an activating agent quantity may include determining the nature of the deflocculating agent and/or the activating agent to be added. For example, the nature of these agents may correspond to a family of chemical molecules or to a particular chemical molecule or combination of molecules.

Indeed, the deflocculating agent can be a combination of molecules and the selection of a deflocculating agent quantity can then correspond to the selection of quantity of each of the molecules constituting the deflocculating agent. The same applies to the activating agent, which may be one molecule or a plurality of molecules.

Advantageously, the selection is made based on a comparison of the one or more measured values of the physicochemical property of an excavated clay soil with reference values. In particular, the reference values include correlations between measured values of at least one physicochemical property of a clay soil and deflocculating agent and activating agent quantities adapted to said clay soil to form a construction material.

Deflocculating Agent

Many compounds can act as deflocculating agents and many are generally known to the one skilled in the art.

In the framework of the invention, the deflocculating agent is in particular a nonionic surfactant such as a polyoxyethylene ether. The polyoxyethylene ether may for example be selected from: a poly(oxyethylene) lauryl ether.

The deflocculating agent may also be an anionic agent such as an anionic surfactant. In particular, the anionic agent may be selected from: alkylaryl sulfonates, amino alcohols, carbonates, silicates, fatty acids, humates (e.g. sodium humates), carboxylic acids, lignosulfonates (e.g. sodium lignosulfonates), polyacrylates, phosphates, or polyphosphates such as sodium hexametaphosphate, sodium tripolyphosphate, sodium orthophosphate, carboxymethylcelluloses, and mixtures thereof.

The deflocculating agent may also be a polyacrylate. It may then be selected, for example, from sodium polyacrylate and ammonium polyacrylate.

The deflocculating agent may also be an amine selected, for example, from: 2-amino-2-methyl-1-propanol; mono-, di-, or triethanolamine; isopropanolamines (1-amino-2-propanol, diisopropanolamine, and triisopropanolamine), and N-alkylated ethanolamines.

The deflocculating agent may also be a silicate such as sodium silicate, sodium metasilicate, or sodium trisilicate.

Alternatively, as discussed above, the deflocculating agent may be a mixture of compounds, such as a mixture including at least two compounds selected from: nonionic surfactant, anionic agent, polyacrylate, amine, and organophosphorus compound.

In particular, the deflocculating agent may be a mixture of sodium silicate and sodium carbonate. Preferably, the deflocculating agent is selected from: a lignosulfonate (e.g. sodium lignosulfonate), a polyacrylate, a humate, and mixtures thereof.

The deflocculating agent is preferably in the form of a salt.

However, the invention is not limited to the above-mentioned deflocculating agents, any type of deflocculating agent known to the one skilled in the art may be used instead of the above-mentioned deflocculating agents.

Activating Agent

It is the activating agent, in conjunction with the excavated clay soil and the deflocculating agent, that will give the construction material its mechanical properties of interest.

Without being limited by the theory, the activating agent can allow the constitution of a network between the clay sheets which will confer the construction material according to the invention its mechanical properties.

In particular, the activating agent may include metal oxides and/or be an alkaline activating composition.

Preferably, the metal oxides are transition metal oxides. More preferably, the metal oxides are selected from: iron oxides such as FeO, $Fe_3O_4$, $Fe_2O_3$, $Fe_2O_3$, alumina $Al_2O_3$, manganese(II) oxide MnO, titanium(IV) oxide $TiO_2$, and mixtures thereof.

The metal oxides may preferably be derived from a composition of blast furnace slag, for example, formed during the production of pig iron from iron ore.

The metal oxides are present at a content of at least 2 wt % of the construction material, preferably at least 5 wt % of the construction material, more preferably at least 10 wt % of the construction material.

When the activating agent is an alkaline activating composition. The alkaline composition may preferably include a compound having a pKa greater than or equal to 10, more preferably greater than or equal to 12, even more preferably substantially equal to 14.

The alkaline composition may, for example, include an organophosphorus compound such as sodium tripolyphosphate, designated by the acronym NaTPP.

In particular, the activating agent may include a mixture of sodium hydroxide and sodium silicate. Advantageously, the activating agent may be an alkaline activating composition further including metal oxides. As will be shown in the examples, construction binders prepared from such an activating agent have good mechanical properties. Thus, preferably, the activating agent may include metal oxides and at least one compound having a pKa greater than or equal to 10.

In addition, the selection step 170 may include determining 172 an additive quantity to be incorporated into the construction material composition. Indeed, the selection method according to the invention can lead to a construction material composition including some additives in determined concentrations. These additives allow the chemical and/or mechanical properties of the final construction material to be modified.

The additive is selected, for example, from: a plasticizer, a synthetic or natural rheological holding agent, an anti-shrinkage agent, a water retention agent, an air entraining agent, a synthetic resin, a pigment, and mixtures thereof.

The plasticizer may, for example, be a polyacrylate, a polynaphthalene sulfonate, a polycarboxylate, or a polyphosphonate.

In addition, the selection step 170 may include determining 173 a filler quantity to be incorporated into the mix so as to form a site concrete. These fillers allow the mechanical properties of the final construction material to be modified.

The filler can, for example, be selected from recycled or non-recycled aggregates, powders, sand, gravel, crushed concrete, and/or fibers.

The fibers are selected, for example, from: vegetable fibers such as cotton, flax, hemp, cellulose, bamboo, miscanthus fibers, synthetic fibers such as metal, glass, carbon, polypropylene fibers, and mixtures thereof. The presence of fibers can allow the formation of a construction material with improved mechanical and insulating properties.

Advantageously, and as previously discussed, the step of determining 170 a deflocculating agent quantity and an activating agent quantity adapted to the excavated clay soil includes implementing a previously calibrated calculation algorithm.

This calculation algorithm may have been built from different learning models, in particular partitioning, supervised, or unsupervised models.

An unsupervised statistical learning model can, for example, be selected from an unsupervised Gaussian mixture model, a hierarchical bottom-up classification (Hierarchical clustering Agglomerative in Anglo-Saxon terminology), a hierarchical top-down classification (hierarchical clustering divisive in Anglo-Saxon terminology).

A statistical supervised learning model can, for example, be selected among kernel methods (e.g. Support Vector Machines SVM, Kernel Ridge Regression) described for example in Burges, 1998 (Data Mining and Knowledge Discovery. A Tutorial on Support Vector Machines for Pattern Recognition), set methods (e.g. Bagging, Boosting, Decision Trees, Random Forest) described, for example, in Brieman, 2001 (Machine Learning. Random Forests), or neural networks described, for example, in Rosenblatt, 1958 (The perceptron: a probabilistic model for information storage and organization in the brain).

Preferably, the previously calibrated calculation algorithm has been obtained by implementing a statistical supervised learning method.

Thus, according to another aspect, the invention relates to a method 200 for calibrating a calculation algorithm. This calculation algorithm is particularly dedicated to the determination of the composition of a construction material. A calibration method according to the invention can in particular be implemented by a digital device comprising a learning module.

Figure 2:
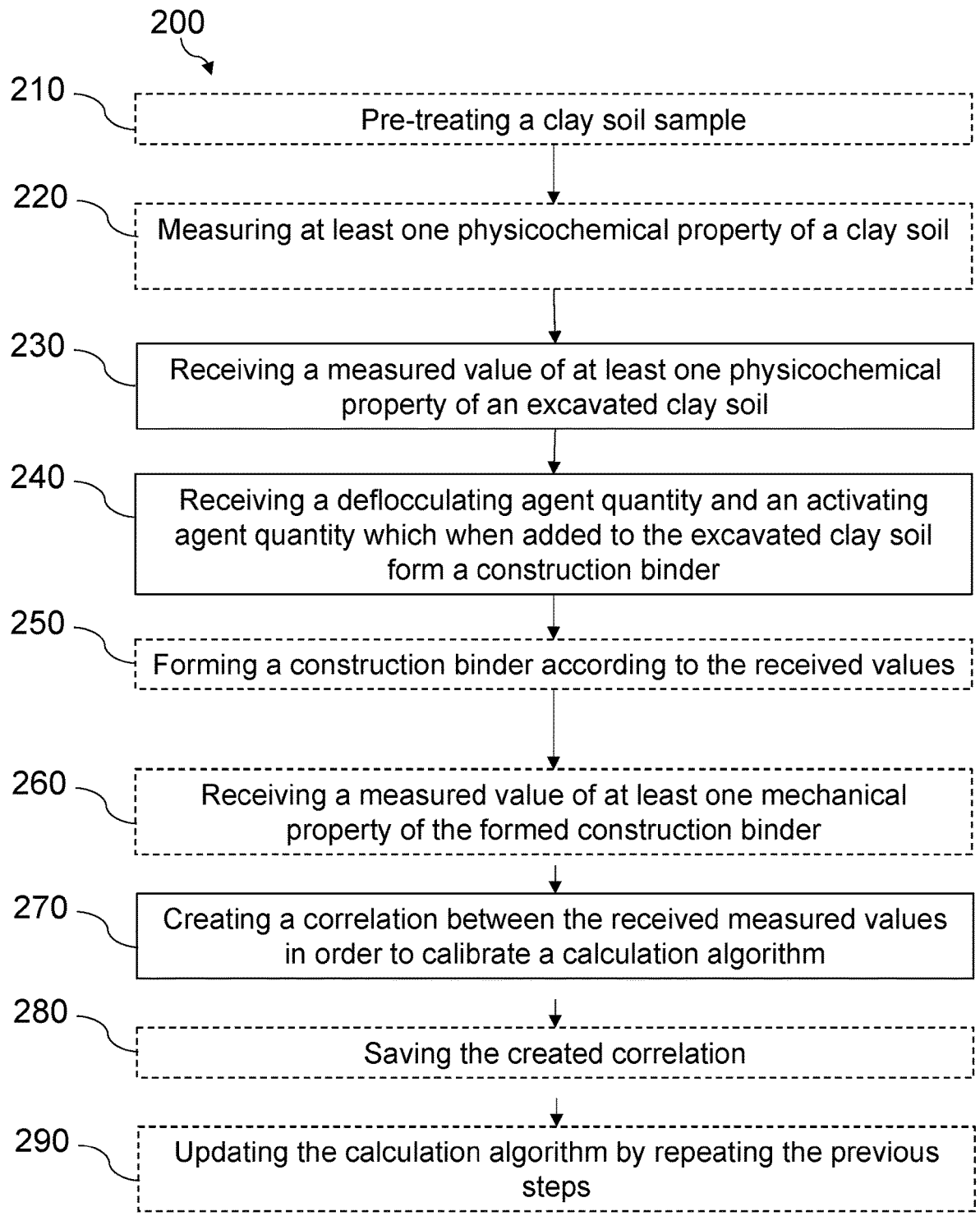
FIG. 2 represents the steps of a method for calibrating a calculation algorithm for determining the composition of a site construction material. The steps in dotted lines are optional.

As illustrated in FIG. 2, such a calibration method according to the invention includes a step of receiving 230 a measured value of at least one physicochemical property of an excavated clay soil.

Preferably, several measured values and in particular values of at least two, more preferably at least three, and even more preferably at least four physicochemical properties of an excavated clay soil, are received. Indeed, depending on the number of physicochemical properties taken into account, the calibration method will be of better quality.

The calibration method according to the invention also includes a step of receiving 240 a deflocculating agent quantity value and an activating agent quantity value. These values correspond to the quantities of agents which, once added to the excavated clay soil, make it possible to form a construction material.

The deflocculating agent and activating agent quantity may correspond to a volume, a mass, or a proportion. Preferably, the quantity corresponds to a proportion relative to an excavated clay soil quantity to be added to the construction material composition. Alternatively, if the quantity corresponds to a volume or mass, it is then associated with a quantity of excavated clay soil to be added to the construction material composition. In addition, receiving 240 deflocculating agent and activating agent quantity values may include receiving the nature of the deflocculating agent and/or the activating agent. For example, the nature of these agents may correspond to a family of chemical molecules or to a particular chemical molecule or to a combination of molecules.

These values may have been obtained through tests that will be described in the examples section. Only those quantities of agents which enable the formation of a construction material are included in the calibration method.

Indeed, the calibration method may include a step of forming 250 a construction material according to the received values. Alternatively, and preferably, a plurality of combinations of agent quantity values have been tested on a plurality of excavated clay so as to form a database that can be used as input data to the calibration method.

The method then includes a step of creating 270 a correlation between the received measured values in order to calibrate a calculation algorithm. This correlation step, based on measured values, allows a calculation algorithm to be built from a statistical learning model. Thus, the calculation algorithm can take the form of a function fin an equation of the type $$Y = f(E, A, D)$$

Preferably, as shown in FIG. 2, prior to the creation step 270, the calibration method according to the invention may further include a step of receiving 260 a measured value of at least one mechanical property of the formed construction material. In fact, in addition to using the agent quantity values and the one or more values of the physicochemical property of the excavated clay soil, the calibration method according to the invention can use one or more measured values of the resulting construction material. Thus, the calculation algorithm can take the form of a function $f$ in an equation of the type:

$$M = f(E, A, D)$$

Preferably, several measured values, and in particular values of at least two, more preferably at least three and even more preferably at least four physicochemical properties of the construction material, are received 260.

In addition, as illustrated in FIG. 2, the calibration method according to the invention may include a step of pretreating 210 a sample of clay soil that may come before a step of measuring 220 at least one physicochemical property of a clay soil. In addition, once the correlation is established, it can be saved 280 on a storage medium such as a RAM or non-volatile memory.

Advantageously, a calibration method according to the invention may include a step of updating 290 the calculation algorithm by repeating the preceding steps described above and at least: Receiving 230 a measured value of at least one physicochemical property of an excavated clay soil, Receiving 240 a deflocculating agent quantity and an activating agent quantity which when added to the excavated clay soil form a construction material, and Creating 270 a correlation between the received measured values so as to calibrate a calculation algorithm.

According to another aspect, the invention relates to a method 300 for preparing a construction material from an excavated clay soil.

Figure 3:
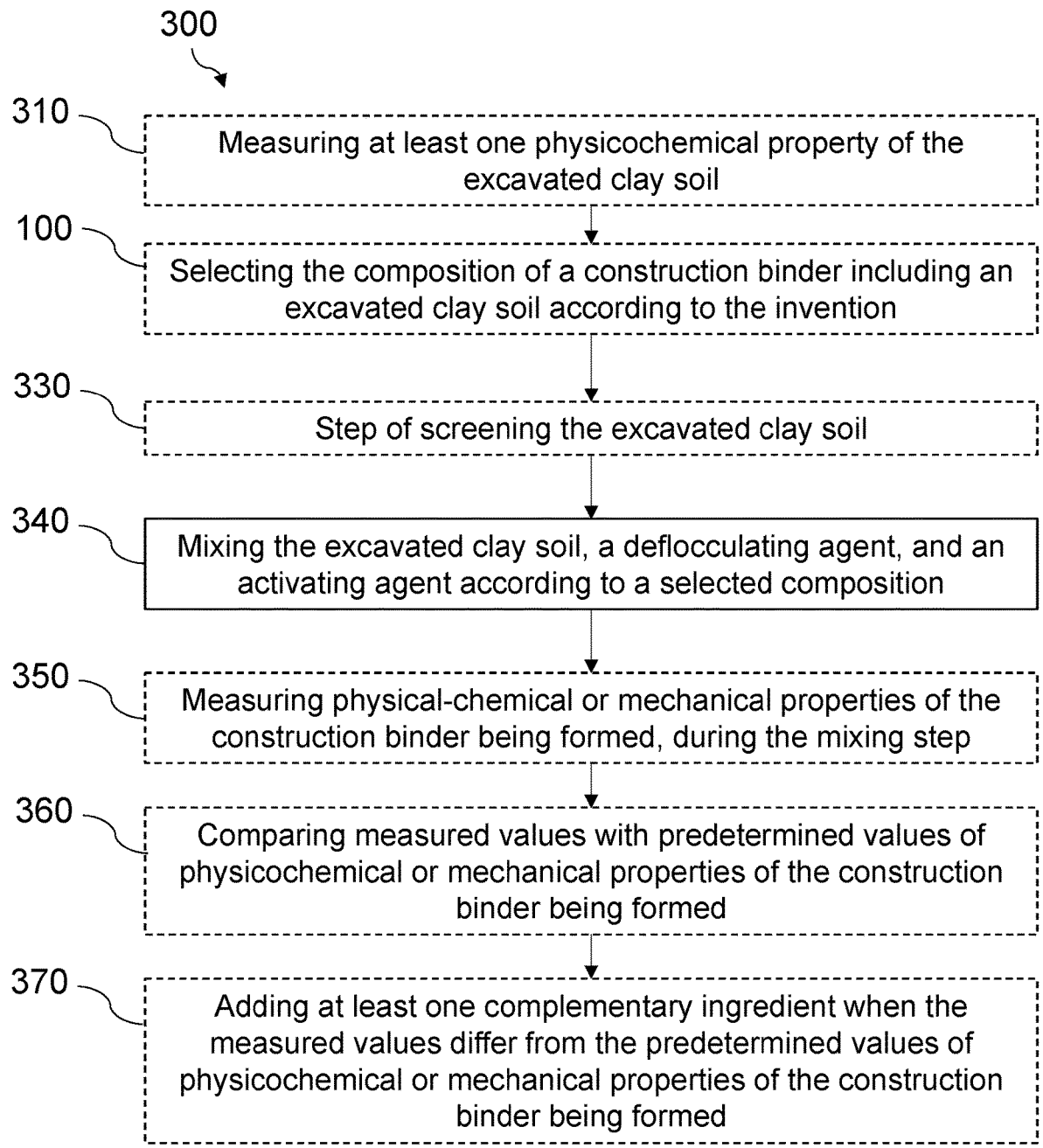
FIG. 3 represents the steps of a method for preparing a construction material from an excavated clay soil. The steps in dotted lines are optional.

Such a method according to the invention, illustrated in FIG. 3, has the advantage of being a so-called low-carbon method, that is to say a method the greenhouse gas emissions, such as carbon dioxide emissions in particular, of which are reduced compared to the greenhouse gas emissions of known methods for preparing construction binders. Such reductions in greenhouse gas emissions are linked in particular to the absence of a calcination stage, which is particularly energy-intensive.

Furthermore, the preparation of a construction binder according to the invention may allow the preparation of a site concrete made at least in part from raw material from the construction site. Such characteristics further reduce the environmental footprint of the concrete produced. Once a deflocculating agent quantity and an activating agent quantity adapted to the excavated clay soil have been selected, it is possible, according to conventional methods, to proceed with the preparation of a construction material from an excavated clay soil.

The preparation method according to the invention may include a step of measuring 310 at least one physicochemical property of the excavated clay soil.

Such a step may be performed well before the mixing step 340. This is the case, for example, if preliminary studies are carried out and there is no need to use the excavated soil quickly. Alternatively, the step of measuring 310 at least one physicochemical property of the excavated clay soil may be performed just before the steps of selecting 100 the composition of a construction material, corresponding to a step of implementing the method 100 according to the invention, and mixing 340. This is the case, for example, in an automated method for the preparation of a construction material from an excavated clay soil, where the excavated clay soil is analyzed in line with a transportable measuring device and then mixed continuously with selected agent quantities so as to form a construction material in a very short time.

Preferably, several measured values and in particular values of at least two, more preferably at least three, and even more preferably at least four physicochemical properties of the excavated clay soil, are received.

Figure 4:
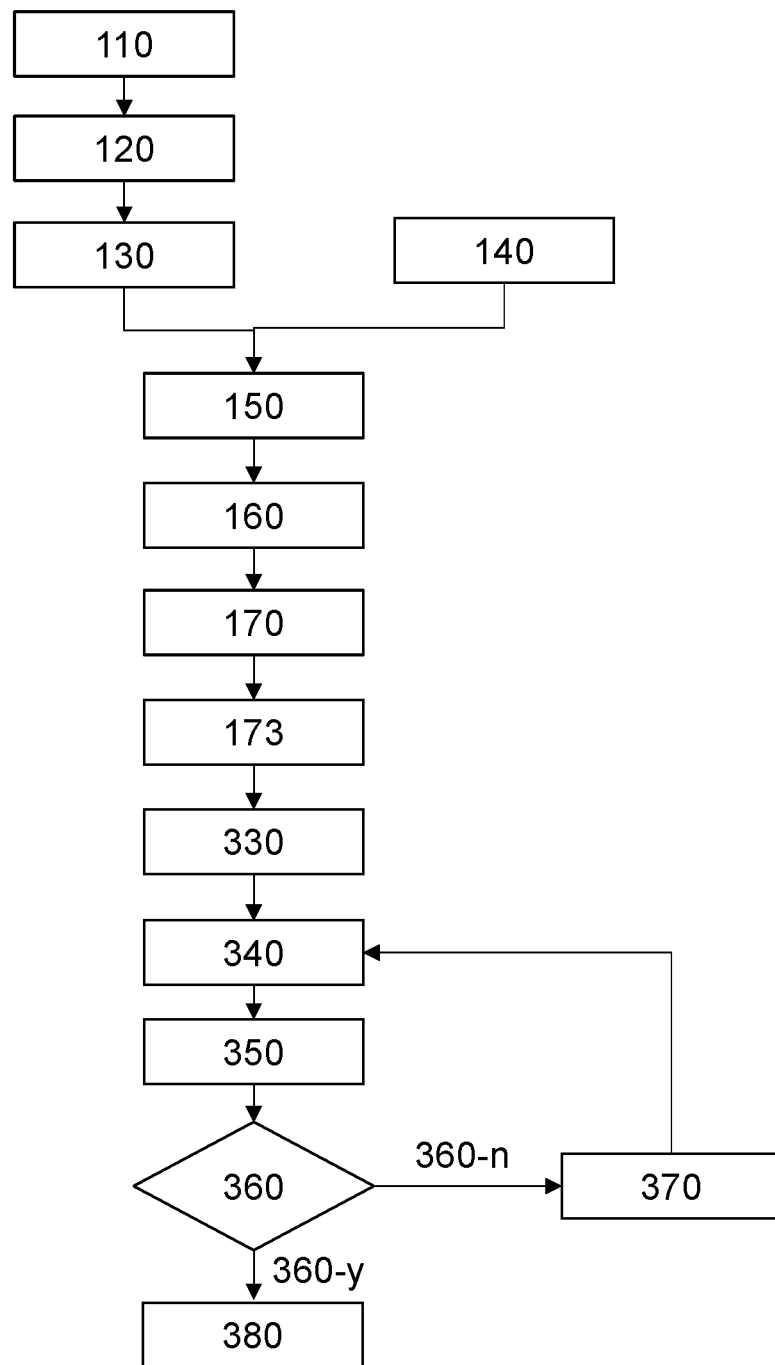
FIG. 4 represents a method for preparing a construction material according to one embodiment of the invention.

Furthermore, as illustrated in FIG. 3 and FIG. 4, a preparation method according to the invention may include selecting 100 the composition of a construction material including an excavated clay soil according to the invention.

In addition, it may include a step of mixing 340 the excavated clay soil, a deflocculating agent, and an activating agent according to the selected composition.

In the mixing step, water can be added in such a way that the ratio of the mass of water to the mass of construction material is less than 1, and for example between 0.4 and 0.8. In addition, water can advantageously be added after the excavated clay soil and the deflocculating agent have been dry-mixed.

Thus, preferably, the method according to the invention may include a mixing step so as to obtain a suspension of dispersed or deflocculated excavated clay soil. When mixing, preferably, the deflocculating agent is added before the activating agent so that the activating agent is mixed with dispersed or deflocculated excavated clay soil.

This mixing step 340 of the clay suspension can advantageously, but not limitatively, be carried out in a device selected among: a mixer and a truck mixer or more generally within any device adapted to mix a clay soil.

Preferably, the preparation method may include a step of screening 330 the excavated clay soil. This screening step occurs before the mixing step 340 and before or after the measuring step 310. In particular, it is carried out in such a way as to remove aggregates, the diameter of which is greater than 20 mm (for millimeter).

In a broader sense, the preparation method may include a step of preparing the excavated clay soil, where said preparation may include, for example: drying, grinding, sieving, storing.

Preferably, the pretreatment or screening step includes at least one fractionation such as sieving, more preferably fractionation such as a 50 μm sieving. Advantageously, but not limitatively, the elements or particles thus sifted, such as for example sand and/or aggregate fractions, can be reused in the formulation of the construction material and in particular of the site concrete. The most interesting fraction for the preparation of the construction material is the fraction not retained by the sieve. Thus, a method 300 according to the invention for preparing a construction material from an excavated clay soil will advantageously include a step of fractioning 335 the optionally sifted excavated clay soil, said fractioning preferably being carried out at 50 μm.

Alternatively, the excavated clay soil may not be pre-treated, and all of the clay soil is used to obtain the construction material. In this case, the method allows a site concrete to be produced. This advantageously makes it possible to reclaim all the excavated clay soil, in particular in the case where the physicochemical properties associated with the said excavated clay soil are sufficient to obtain a construction material with the desired mechanical properties. In this way, all the soil can be reclaimed from the outset without the need to isolate the clay to process it and formulate the material.

Figure 5:
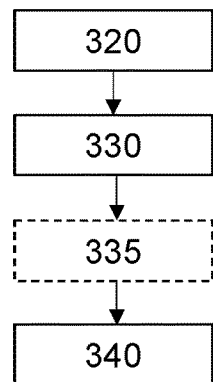
FIG. 5 represents a method for preparing a construction material according to one embodiment of the invention. The steps in dotted lines are optional.
Figure 6:
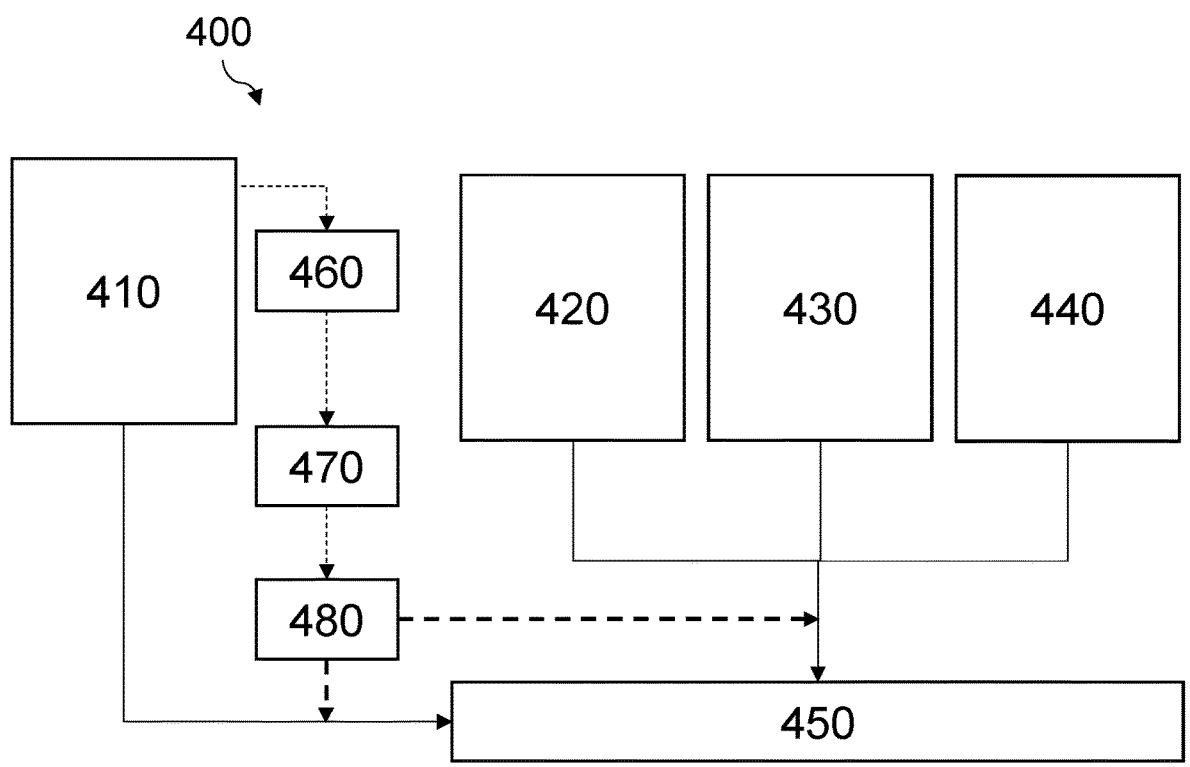
FIG. 6 represents a diagram showing a functional architecture of the system for preparing a construction material including an excavated clay soil according to the invention. The solid arrows represent transport means and the dotted arrows represent data transfer or instructions, in particular to said transport means.

As illustrated in FIG. 5, a method 300 according to the invention for preparing a construction material from an excavated clay soil will advantageously include:
- a step of excavating 320 a clay soil;
- a step of screening 330 the excavated clay soil when the excavated clay soil includes stones retained by a 2 cm screening;
- a step of mixing 340 the excavated clay soil, preferably the fraction of less than 50 μm, a deflocculating agent and an activating agent.

In addition, the preparation method can advantageously include a step of treating the pollutants. Such a pollutant treatment step allows the concentration of pollutants, such as traces of metallic elements, hydrocarbons (e.g. Polycyclic Aromatic Hydrocarbons and C10 to C40), PCB (Polychlorinated Biphenyls), BTEX (benzene, toluene, ethylbenzene, xylenes), TOC (total organic carbon), to be reduced in the excavated clay soil.

Furthermore, conventionally, before, concomitantly with, or after the addition of the activating composition, a method according to the invention may include adding additives or fillers for modifying the mechanical properties of the final construction material.

Advantageously, the preparation method may include measuring 350 one or more values of physicochemical or mechanical properties of the construction material, during the mixing step (i.e. the construction material is being formed), comparing 360 the measured values with predetermined values of physicochemical or mechanical property of the construction material being formed.

Thus, it is possible to carry out a quality control of the construction material being formed.

Furthermore, when the measured values differ from predetermined values of physicochemical or mechanical properties of the construction material being formed, the preparation method may include a step of adding 370 at least one complementary ingredient.

Herein, the complementary ingredient may for example be selected from: a deflocculating agent, an activating agent, and an excavated clay soil so as to modify the predetermined composition. The complementary ingredient may also be selected from: additives or fillers as described above. This ensures that the construction material being formed will have mechanical properties as close as possible to the expected mechanical properties. Indeed, a deviation can be identified at the time of mixing and corrected before the material is used.

Furthermore, as illustrated in FIG. 4, the method is completed by a step of recovering 380 the formed construction material.

According to another aspect, the invention relates to a system 400 for preparing a construction material including an excavated clay soil. Alternatively as discussed, the invention relates to a system 400 for preparing a site concrete including an excavated clay soil. Such a method according to the invention, illustrated in FIG. 5, may include containers 410, 420, 430 for the various components of the construction material. For example, it may include at least one container 410 for an excavated clay soil, at least one container 420 for a deflocculating agent, and at least one container 430 for an activating agent. In addition, it may include at least one container 440 for fillers and/or additives. In addition, the system may include a cleaning container for holding a cleaning solution.

Especially in the case of the excavated clay soil, the container 410 may not be an object but only a place where the excavated clay soil is stored. A container can also be selected from a tank, a container, a bin, a silo.

In addition, the system according to the invention includes a mixing device 450. In particular, such a device is capable of homogenizing and/or stirring the precursor ingredients of the construction binder.

This mixing device 450 is in particular coupled to automated transport means (represented by an arrow between the containers 410, 420, 430, 440, and the mixing device 450, respectively) positioned between the containers 410, 420, 430, and the mixing device 450. These transport means can be, for example, flexible or non-flexible pipes, belts, conveyors, or augers. In addition, in combination with the transport means, the system may include pumps, valves, solenoid valves, and flow restrictors. In particular, the flow restrictors may be arranged in functional switching with each of the transport means to independently regulate the quantity of each of the ingredients delivered to the mixing device 450.

In addition, the system according to the invention may include a means for measuring 460 at least one physicochemical property of the excavated clay soil. Such a measuring means 460 may be, for example, a pH meter, an X-ray diffractometer, a conductivity meter, an electron microscope, a mercury porosimeter, a spectrofluorometer, an ICP-MS, an HPLC-MS, a GC-MS, the measurement of the specific surface area by the BET method, a granulometer, or a rheometer. In addition, the system according to the invention may include calculation means 470 adapted to, preferably configured to, implement a computer program configured to perform:

A step of obtaining a measured value of at least one physicochemical property of the excavated clay soil; and A step of determining a deflocculating agent quantity and an activating agent quantity suitable for the excavated clay soil based on a comparison of the one or more measured values with reference values.

Furthermore, the system according to the invention includes a control module 480 configured to generate output signals for use by the automated transport means. Such output signals will allow the system to transport the determined deflocculating agent and activating agent quantities to the mixing device 450. In addition, they may allow a predetermined excavated clay soil quantity to be transported to the mixing device 450.

Preferably, the system for preparing a construction material according to the invention may further include: a screen, preferably a compact one, a soil crusher, a planetary mixer.

More preferably, it can include a soil crusher. In particular, the soil crusher makes it possible to eliminate the presence of agglomerates that could influence the quality of the construction binder or the site concrete. In addition, the powdered clay soil will provide a homogeneous appearance in the site concrete.

Even more preferably, the system for preparing a construction material according to the invention includes a sifter for isolating pebbles with a diameter greater than 10 cm, preferably greater than 2 cm. The system for preparing a construction material may also include a sorting means, for example of the sieve type, for isolating particles with a diameter of less than 50 µm, preferably particles with a diameter of less than 20 µm. Advantageously, but not limitatively, the elements or particles thus separated, such as for example sand and/or aggregate fractions, can be reused in the formulation of the construction material and in particular of the site concrete.

Alternatively, the excavated clay soil may not be pretreated, and all of the clay soil is used to obtain the construction material. In this case, the method allows a site concrete to be produced.

In addition, it may include a pollution-control device for treating the excavated soil before it is used.

Thus, according to another aspect, the invention relates to a construction material formed from an excavated clay soil. In particular, this construction material may be prepared according to a preparation method according to the invention described above. For example, this construction material is directly prepared according to a preparation method according to the invention described above.

The construction material according to the present invention is characterized in that it includes a deflocculating agent and an excavated clay soil. It should be noted that the preparation of the construction material includes adding an activating agent. However, since this activating agent can react with the excavated clay soil, it is not systematically found in the construction material. Nevertheless, occasionally, the construction material according to the present invention may include a deflocculating agent, an activating agent, and an excavated clay soil.

Given the possible addition of fillers, the invention also relates to a site concrete characterized in that it includes a deflocculating agent and an excavated clay soil.

Alternatively, in the absence of added fillers, the invention also relates to a construction binder characterized in that it includes a deflocculating agent and an excavated clay soil. Advantageously, the construction material according to the invention includes a mixture of different types of clays. In particular, it may include a clay combination selected from:
illite and kaolinite,
illite and kaolinite and bentonite,
illite and bentonite,
kaolinite and bentonite,
illite and montmorillonite, or
a combination of kaolinite, illite, smectite, bentonite, chlorite, montmorillonite, muscovite, hallocyte, sepiolite, attapulgite, and vermiculite.

Furthermore, advantageously, the construction material is formed from an excavated clay soil characterized in that it includes at most 80 wt % of particles larger than 2 µm, preferably at most 60 wt % of particles larger than 2 µm. The content of particles larger than 2 µm can for example be measured according to the NF X31-107 standard. Thus, the excavated soil has preferably undergone a pretreatment step resulting in a particle size centered on a fraction with a size diameter less than or equal to 50 µm, preferably less than or equal to 20 µm.

Preferably, a construction material according to the invention comprises at least 50 wt % of excavated clay soil, at least 60 wt % of excavated clay soil, at least 70 wt % of excavated clay soil, at least 80 wt % of excavated clay soil, most preferably at least 90 wt % of excavated clay soil. This is advantageously the case when the construction material is a construction binder.

Indeed, selecting the deflocculating agent and activating agent quantity offers the advantage of being able to form a construction binder with a high quantity of excavated clay soil without altering the mechanical properties of the resulting construction materials. When the construction material is a site concrete, it may include at least 10 wt % of excavated clay soil, at least 15 wt % of excavated clay soil, at least 20 wt % of excavated clay soil, at least 30 wt % of excavated clay soil, at least 40 wt % of excavated clay soil, at least 50 wt % of excavated clay soil.

The deflocculating agent may account for at least 0.1 wt % of the construction material, at least 0.20 wt % of the construction material, at least 0.25 wt % of the construction material, preferably at least 0.5 wt % of the construction material, more preferably at least 1 wt % of the construction material, even more preferably at least 1.5 wt % of the construction material, and for example at least 2 wt % of the construction material. This is advantageously the case when the construction material is site concrete.

The deflocculating agent may account for at least 0.30 wt % of the construction material, at least 0.5 wt % of the construction material, preferably at least 1 wt % of the construction material, more preferably at least 1.5 wt % of the construction material, even more preferably at least 2 wt % of the construction material, and for example at least 2.5 wt % of the construction material. This is advantageously the case when the construction material is a construction binder.

In addition, the deflocculating agent may account for at most 20 wt % of the construction material, preferably at most 15 wt % of the construction material, and more preferably at most 10 wt % of the construction material.

In particular, the deflocculating agent may account for between 0.25 and 10 wt % of the construction material, preferably between 0.5 and 10 wt % of the construction material, more preferably between 1 and 10 wt % of the construction material, even more preferably between 2 and 8 wt % of the construction binder, and for example between 2 and 5 wt % of the construction binder. Thus, the deflocculating agent may preferably account for between 0.1 and 5 wt % of the construction material.

In particular, the deflocculating agent accounts for at least 0.5 wt % of the excavated clay soil, preferably at least 1 wt % of the excavated clay soil, more preferably at least 2 wt % of the excavated clay soil, even more preferably at least 3 wt % of the excavated clay soil, and for example at least 4 wt % of the excavated clay soil. Indeed, with such deflocculating agent concentrations, the binder formulation according to the invention can then be used in combination with an activating composition to form a material with advantageous mechanical properties.

Furthermore, the deflocculating agent accounts for at most 20 wt % of the excavated clay soil, preferably at most 10 wt % of the excavated clay soil. Indeed, too high a concentration is not necessary to form a material with advantageous mechanical properties.

In particular, the deflocculating agent accounts for between 0.5 and 20 wt % of the excavated clay soil, preferably between 1 and 10 wt % of the excavated clay soil, more preferably between 3 and 10 wt % of the excavated clay soil and even more preferably between 4 and 10 wt % of the excavated clay soil.

The activating agent is, for example, present at a content of at least 5 wt % of the construction material, preferably at least 7 wt % of the construction material, more preferably at least 8 wt % of the construction material. This is advantageously the case when the construction material is a site concrete.

The activating agent may be present at a content of at least 10 wt % of the construction material, preferably at least 15 wt % of the construction material, more preferably at least 20 wt % of the construction material, even more preferably at least 25 wt % of the construction binder, and for example at least 30 wt % of the construction binder.

In addition, the activating agent may account for at most 50 wt % of the construction material, preferably at most 45 wt % of the construction material, and more preferably at most 40 wt % of the construction material. This is advantageously the case when the construction material is a construction binder.

The activating agent may also account for at most 15 wt % of the construction material, preferably at most 12 wt % of the construction material, and more preferably at most 10 wt % of the construction material. This is advantageously the case when the construction material is a site concrete.

In particular, the activating agent may account for between 3 and 12 wt % of the construction material, preferably between 4 and 10 wt % of the construction material, more preferably between 5 and 10 wt % of the construction material. This is advantageously the case when the construction material is a site concrete.

In particular, the activating agent may account for between 10 and 80 wt % of the construction material, preferably between 15 and 80 wt % of the construction material, more preferably between 20 and 80 wt % of the construction material, even more preferably between 30 and 80 wt % of the construction material, and for example between 40 and 60 wt % of the construction material. This is advantageously the case when the construction material is a construction binder.

In one particular embodiment, a construction material, preferably a construction binder according to the invention comprises:
  30% to 80 wt % of an excavated clay soil,
  1% to 10 wt % of a deflocculating agent, and
  10% to 50 wt % of an activating agent.

Preferably, a construction material, preferably a construction binder, according to the invention comprises:
  50% to 75 wt % of an excavated clay soil,
  1% to 10 wt % of a deflocculating agent, and
  15% to 50 wt % of an activating agent.

More preferably, a construction material, preferably a construction binder according to the invention comprises:
  50% to 70 wt % of an excavated clay soil,
  2% to 5 wt % of a deflocculating agent, and
  15% to 45 wt % of an activating agent.

More preferably, a construction material, preferably a construction binder, according to the invention comprises:
  50% to 60 wt % of an excavated clay soil,
  2% to 5 wt % of a deflocculating agent, and
  25% to 45 wt % of metal oxides.

Even more preferably, a construction material, preferably a construction binder, according to the invention comprises:
  30% to 80 wt % of an excavated clay soil,
  1% to 10 wt % of a deflocculating agent,
  10% to 40 wt % of metal oxides, and
  2% to 15 wt % of a strong base.

Even more preferably, a construction material, preferably a construction binder, according to the invention comprises:
  30% to 80 wt % of an excavated clay soil,
  0.1% to 10 wt % of a deflocculating agent, and
  15% to 50 wt % of blast furnace slag.

Even more preferably, a construction material, preferably a construction binder according to the invention comprises:
  30% to 80 wt % of an excavated clay soil,
  0.1% to 10 wt % of a deflocculating agent,
  10% to 45 wt % of blast furnace slag, and
  5% to 20 wt % of an alkaline composition such as triphosphate.

Preferably, a construction material according to the invention is a site concrete comprising:
  between 5 and 45 wt %, preferably between 5 and 30 wt %, more preferably between 10 and 20 wt % of a construction binder according to the invention;
  between 25 and 45 wt %, preferably between 30 and 40 wt % of sand, for example from site soil, preferably from excavated clay soil;
  between 35 and 55 wt %, preferably between 40 and 50 wt % of aggregates, for example from site soil, preferably from excavated clay soil; and
  preferably between 2 and 10 wt % of water.

More preferably, a construction material according to the invention is a site concrete comprising:
  between 5 and 20 wt % of raw clay from the excavated clay soil, preferably between 5 and 15 wt % of raw clay from the excavated clay soil;

between 0.1 and 3 wt % of a deflocculating agent;
between 3 and 15 wt %, preferably between 5 and 12 wt % of an activating agent; for example, between 5% and 10 wt % of a blast furnace slag;
between 25 and 45 wt %, preferably between 30 and 40 wt % of sand, for example from site soil, preferably from excavated clay soil;
between 35 and 55 wt %, preferably between 40 and 50 wt % of aggregates, for example from site soil, preferably from excavated clay soil; and
preferably between 2 and 10 wt % of water.

Sand and aggregates may be obtained from quarries. In addition, the binder may include quarry clay to supplement the clay from the excavated clay soil.

In addition, the site concrete may include admixtures such as plasticizers, superplasticizers, rheological retention agents, or air-entraining agents.

In addition, the water to dry matter weight ratio of the construction binder is advantageously controlled and is preferably less than 1, more preferably substantially equal to 0.6.

In addition, according to another aspect, the invention relates to a construction material formed from a construction binder according to the invention.

Furthermore, the invention relates to a construction material obtained from a preparation method according to the invention. The invention relates to a construction material obtained from a preparation method according to the invention.

The invention allows in particular the production of:
insulating construction material: from a construction binder according to the invention with the addition of light aggregates of the "vegetable or porous" type;
lightweight concrete: from a construction binder according to the invention with an added foaming agent of the aluminum powder type. This will trap air in the material and improve its insulating properties;
Prefabrication elements: manufacture of concrete blocks or slabs in a factory from the construction binder according to the invention; and
Isolation modules.

As illustrated by the following examples, the present invention provides a solution based on a mixture of a raw clay matrix, a deflocculating agent, and an activating composition to provide a construction material with mechanical properties similar to the standard while having a reduced carbon footprint.

EXAMPLES

Methodology for Measuring the Physicochemical Properties of the Clay Soil:

The clay soil is pre-sieved to remove all elements or particles with a diameter greater than 20 μm. Such a pretreated clay soil is particularly suitable for forming a construction binder according to the invention.

The pH is measured using 20 g of pretreated clay soil mixed with 100 mL of distilled water. After stirring for 20 minutes at 150 rpm (for "revolutions per minute" according to an Anglo-Saxon terminology), the suspension is filtered and then the pH of the filtered solution is measured.

The clay content is measured in a conventional way by the granulometric method described in the NF X31-107 standard.

The nature of the clays is conventionally measured by X-ray diffractometry.

Generation of Similarity Values As presented previously, the values include correlations between measured values of at least one physicochemical property of a clay soil and deflocculating agent and activating agent quantity values.

These reference values are generated from a plurality of clay soil samples coupled with varying deflocculating agent and activating agent quantities in a method for preparing a construction binder described below.

The generation of reference values may for example implement an experimental design such as a simplex design, a screening design, a factorial design, a response surface design, a mixture design, a Taguchi design.

Table 1 below presents the physicochemical properties of different excavated soil samples while Table 2 shows an example of an experimental design to generate reference values.

TABLE 1

| Clay soil | Physicochemical properties | | |
|---|---|---|---|
| | pH | Clay content | Nature of the clays |
| Sample A | 7 to 8 | 90% à 100% | Smectite and Montmorillionite |
| Sample B | 4 to 6 | 90% à 100% | Kaolinite |

TABLE 2

| Reference | Clay soil | Deflocculating agent | | Activating agent | |
|---|---|---|---|---|---|
| | | Nature | Concentration | Nature | Concentration |
| MUP42 | Sample A | na | 0 wt % of the binder | LHF + Alkaline solution | 23 wt % of the binder |
| MUP5B | Sample A | na | 0 wt % of the binder | LHF + Triphosphate | 43 wt % of the binder |
| MUP12 | Sample A | na | 0 wt % of the binder | Blast furnace slag | 25 wt % of the binder |
| MUP11 | Sample A | Sodium humates | 2.73 wt % of the binder | Blast furnace slag | 25 wt % of the binder |
| MUP2 | Sample A | Sodium humates | 2.96 wt % of the binder | Metal oxides | 12 wt % of the binder |
| MUP5 | Sample A | Sodium humates | 3.13 wt % of the binder | LHF + Triphosphate | 42 wt % of the binder |
| MUP41 | Sample A | Sodium humates | 3.39 wt % of the binder | LHF + Alkaline solution | 22 wt % of the binder |

TABLE 2-continued

| Reference | Clay soil | Deflocculating agent | | Activating agent | |
|---|---|---|---|---|---|
| | | Nature | Concentration | Nature | Concentration |
| MUP3 | Sample A | Sodium humates | 3.97 wt % of the binder | Metal oxides | 9 wt % of the binder |

Preparation of a Construction Binder:

The construction binders, in particular when generating the reference values, are prepared according to an identical protocol, i.e. a premix is made between a clay soil and a deflocculating agent in the predetermined quantities according to, for example, an experimental plan, and then water is added and the suspension is mixed at low speed, that is to say substantially at six hundred revolutions per minute for thirty seconds. Next, an activating agent is added to the premix and then the premix is mixed at high speed, that is to say at about fifteen hundred revolutions per minute for three minutes.

The weight ratio of water to dry matter of the composition (also called the construction binder) is adjusted to a value lower than 1, more preferably substantially equal to 0.6.

The thus-formed construction binder is then poured into a mold and left to cure at room temperature, that is to say around 20 degrees Celsius, for 28 days.

The mechanical properties of the construction binder are then evaluated.

Methodology for Measuring the Mechanical Properties of Construction Binders:

After curing is completed, the construction binder is removed from the mold and the mechanical strength is measured. By mechanical strength of a construction binder is meant its compressive strength, such compression being measured in accordance with the NF EN 196-1 standard. The results of the measurements performed on the experiments described in Table 2 are presented below in Table 3.

TABLE 3

| Reference | Mechanical strength (in MPa) |
|---|---|
| MUP42 (comparative example) | 27 |
| MUP5B (comparative example) | 25 |
| MUP12 (comparative example) | 21 |
| MUP11 | 41 |
| MUP2 | 37 |
| MUP5 | 45 |
| MUP41 | 43 |
| MUP3 | 37 |

These results show that depending on the activating agent and deflocculating agent quantities used, the performance of the binder formed will be different and in particular its mechanical strength.

In addition, they show that the presence of a deflocculating agent allows mechanical strengths higher than 30 MPa to be obtained.

Selection of the Composition of a Construction Binder:

After the preparation of reference values and, if necessary, a calculation algorithm, it is possible to implement a method for selecting the appropriate deflocculating and activating agent quantities for a given excavated clay soil.

First, a sample of the excavated clay soil is sieved so as to remove all elements or particles with a diameter greater than 20 μm.

The physicochemical properties of the pretreated excavated clay sample are then analyzed as described above.

The values obtained are then transmitted to a computer device configured to implement the method according to the invention.

The latter then generates values for the deflocculating agent and activation agent quantity that will, when coupled with a predetermined quantity of excavated soil, form a construction binder.

Formation of a Construction Binder According to the Invention

The excavated clay soil is then sieved to remove any elements or particles larger than 2 cm in diameter and then a predetermined quantity of a pretreated excavated clay soil is mixed simultaneously or sequentially with the selected deflocculating agent and activation quantity values.

The construction binders or site concretes formed according to the invention have compressive strengths equivalent to the compressive strengths obtained with a concrete formed with Portland cement. Thus, the present invention allows the appropriate composition to be selected, which will make it possible to form a low-carbon construction binder, from excavated clay soil, having sufficient mechanical properties to make it a construction material meeting the majority of the needs of the sector.

The invention claimed is:

1. A method for selecting the composition of a construction material including an excavated clay soil, said construction material composition to include deflocculating agent and activating agent quantities adapted to the excavated clay soil, said method being implemented by a computer device including a calculation module, said method including:
   A step of receiving, from the calculation module, a measured value of at least one physicochemical property of an excavated clay soil; and
   A step of selecting, by the calculation module, a deflocculating agent quantity and an activating agent quantity adapted to the excavated clay soil based on a comparison of the measured value with reference values, said reference values including correlations between prior-measured values of the at least one physicochemical property of a clay soil and deflocculating agent and activating agent quantities adapted to said clay soil to form a construction material.

2. The method according to claim 1, wherein the at least one physicochemical property is selected from: content of clays in the excavated clay soil, nature of the clays, particle size, content of impurities, content of non-clay mineralogical fractions, content of contaminants, elemental analysis, content of metal oxides, salinity, pH, and total exchange capacity of clays in the excavated clay soil.

3. The method according to claim 1, wherein the at least one physicochemical property is measured on a pretreated excavated clay soil, said pretreatment being selected from: crushing, sorting, sieving, and/or drying of the excavated clay soil.

4. The method according to claim 1, first comprising receiving a selected mechanical property value of the construction material, the step of selecting the deflocculating agent and activating agent quantities further including excluding the deflocculating agent and activating agent quantities which will not allow the construction material to exhibit the selected mechanical property value.

5. The method according to claim 1, wherein the step of selecting, by the calculation module, a deflocculating agent quantity and of activating agent quantity adapted to the excavated clay soil includes implementing a previously calibrated calculation algorithm.

6. The method according to claim 5, wherein the previously calibrated calculation algorithm has been obtained by implementing a statistical supervised learning method.

7. A method for preparing a construction material from an excavated clay soil, the method including:
    A step of measuring at least one physicochemical property of the excavated clay soil;
    A step of selecting the composition of a construction material including an excavated clay soil according to the method of claim 1; and
    A step of mixing the excavated clay soil, a deflocculating agent, and an activating agent according to the selected composition.

8. The preparation method according to claim 7 further including:
    a step of measuring physicochemical or mechanical properties of the construction material being formed, during the mixing step,
    a step of comparing the measured values with predetermined values of physicochemical or mechanical properties of the construction material being formed, and
    when the measured values differ from the predetermined values of physicochemical or mechanical properties of the construction material being formed, a step of adding at least one complementary ingredient.

9. A construction material formed from an excavated clay soil, comprising an excavated clay soil, an activating agent, and a deflocculating agent, said deflocculating agent accounting for at least 0.1 wt % of the construction material, said activating agent being an alkaline activating composition.

10. The construction material according to claim 9, further comprising a mixture of different types of clays.

11. The construction material according to claim 9, further comprising metal oxides at a content of at least 2 wt % of the construction material.

12. The construction material according to claim 9, further comprising blast furnace slag.

13. The construction material according to claim 12, comprising:
    30% to 80 wt % of an excavated clay soil,
    0.1% to 10 wt % of a deflocculating agent, and
    5 to 10 wt % of blast furnace slag.

14. The construction material according to claim 12, comprising:
    between 5 and 20 wt % of raw clay from the excavated clay soil;
    between 0.1 and 3 wt % of a deflocculating agent;
    between 3 and 15 wt % of an activating agent;
    between 25 and 45 wt % of sand; and
    between 35 and 55 wt % of aggregates.

15. The construction material according to claim 9, further comprising at least 2 wt % of silt particles.

16. The construction material according to claim 9, wherein the excavated clay soil has been pretreated, said pretreatment being selected from: crushing, sorting, sieving, and/or drying of the excavated clay soil.

17. A method for preparing the construction material according to claim 9 from an excavated clay soil including:
    a step of excavating a clay soil including stones 2 cm in size or greater;
    a step of screening the excavated clay soil to remove said stones 2 cm in size or greater;
    a step of mixing the excavated clay soil, a deflocculating agent, and an activating agent.

18. The construction material according to claim 11, said construction material corresponding to a construction binder.

19. The construction material according to claim 13, said construction material corresponding to a construction binder.

20. The construction material according to claim 14, said construction material corresponding to a site concrete.

21. The construction material according to claim 9, said alkaline activating composition including a compound having a pKa greater than or equal to 10.

22. A construction material formed from an excavated clay soil, comprising an excavated clay soil, an activating agent, and a deflocculating agent, said deflocculating agent accounting for at least 0.25 wt % of the construction material.

23. A method for calibrating a calculation algorithm for determining the composition of a construction material implemented by a digital device including a learning module, said method comprising:
    A first step of receiving, from the learning module, a measured value of at least one physicochemical property of an excavated clay soil;
    A second step of receiving, from the learning module, a deflocculating agent quantity value and an activating agent quantity value which, once added to the excavated clay soil, allow a construction material to be formed;
    A third step of receiving, from the learning module, a measured value of at least one mechanical property of the construction material formed from the excavated clay soil, the measured value of at least one physicochemical property that was received during the first step, and the deflocculating agent and activating agent quantities received during the second step; and
    A step of creating a correlation, by the learning module, between the measured values received so as to calibrate a calculation algorithm.

24. A system for preparing a construction material including an excavated clay soil, said system comprising:
    At least one container including an excavated clay soil,
    At least one container including a deflocculating agent,
    At least one container including an activating agent,
    A mixing device, with automated transport means between the containers and the mixing device,
    A control module configured to generate output signals for use by the automated transport means so as to transport determined quantities of the deflocculating agent and the activating agent to the mixing device.

25. The system for preparing a construction material according to claim 24, further comprising a communication means configured to receive data on a determined deflocculating agent quantity and a determined activating agent quantity, adapted to the excavated clay soil; the control module being configured to generate output signals for use by the automated transport means so as to transport the determined deflocculating agent and activating agent quantities to the mixing device.

26. The system for preparing a construction material according to claim 24, further comprising:
- A means for measuring at least one physicochemical property of the excavated clay soil,
- A calculation means adapted to implement a computer program configured to perform:
  - A step of obtaining a measured value of at least one physicochemical property of the excavated clay soil; and
  - A step of determining a deflocculating agent quantity and an activating agent quantity suitable for the excavated clay soil based on a comparison of the one or more measured values with reference values.

* * * * *